United States Patent
Rana et al.

(10) Patent No.: US 11,934,571 B2
(45) Date of Patent: Mar. 19, 2024

(54) METHODS AND SYSTEMS FOR A HEAD-MOUNTED DEVICE FOR UPDATING AN EYE TRACKING MODEL

(71) Applicant: Tobii AB, Danderyd (SE)

(72) Inventors: Pravin Kumar Rana, Danderyd (SE); Gerald Bianchi, Danderyd (SE)

(73) Assignee: Tobii AB, Danderyd (SE)

(*) Notice: Subject to any disclaimer, the term of this patent is extended or adjusted under 35 U.S.C. 154(b) by 75 days.

(21) Appl. No.: 17/039,918

(22) Filed: Sep. 30, 2020

(65) Prior Publication Data

US 2021/0255698 A1   Aug. 19, 2021

(30) Foreign Application Priority Data

Sep. 30, 2019   (SE) .................................... 1951103-9

(51) Int. Cl.
G06F 3/01 (2006.01)
G06T 7/50 (2017.01)
G06T 7/73 (2017.01)

(52) U.S. Cl.
CPC ............ *G06F 3/013* (2013.01); *G06T 7/50* (2017.01); *G06T 7/73* (2017.01); *G06T 2207/30201* (2013.01)

(58) Field of Classification Search
CPC .. G02B 27/0172; G02B 27/0093; G06T 7/73; G06T 7/50; G06T 2207/30201; G06F 3/013; G06K 9/00597
See application file for complete search history.

(56) References Cited

U.S. PATENT DOCUMENTS

| 10,311,584 | B1  | 6/2019 | Hall et al. |
| 2014/0211995 | A1* | 7/2014 | Model ..................... G06F 3/013 382/103 |
| 2018/0096503 | A1  | 4/2018 | Kaehler et al. |
| 2018/0227470 | A1  | 8/2018 | Rönngren |
| 2019/0253700 | A1  | 8/2019 | Tornéus et al. |
| 2019/0258314 | A1  | 8/2019 | Ollila et al. |
| 2020/0026350 | A1  | 1/2020 | Eash et al. |
| 2020/0064631 | A1* | 2/2020 | Robbins .................. G06F 3/013 |

(Continued)

OTHER PUBLICATIONS

Hansen, Dan, In the Eye of the Beholder: A Survey of Models for Eyes and Gaze, Mar. 2010, IEEE Transactions on Pattern Analysis and Machine Intelligence, vol. 32, No. 3, p. 478-497 (Year: 2010).*

(Continued)

*Primary Examiner* — Xuemei Zheng
*Assistant Examiner* — Nathan P Brittingham
(74) *Attorney, Agent, or Firm* — Christopher Ignatius Moylan

(57) ABSTRACT

A system, a head-mounted device, a computer program, a carrier, and a method for a head-mounted device comprising an eye tracking sensor, for updating an eye tracking model in relation to an eye are disclosed. First sensor data in relation to the eye are obtained by means of the eye tracking sensor. After obtaining the first sensor data, the eye tracking sensor is moved in relation to the eye. After moving the eye tracking sensor, second sensor data in relation to the eye are obtained by means of the eye tracking sensor. The eye tracking model in relation to the eye is then updated based on the first sensor data and the second sensor data.

15 Claims, 3 Drawing Sheets

(56) References Cited

U.S. PATENT DOCUMENTS

2020/0409457 A1* 12/2020 Terrano ................... G06F 3/012
2021/0004082 A1* 1/2021 Suk .......................... G06T 7/73

OTHER PUBLICATIONS

Swedish Search Report regarding SE App. No. 1951103-9, dated Mar. 17, 2020.
Extended European Search Report regarding EPO App. No. 20198158.6, dated Mar. 5, 2021.

* cited by examiner

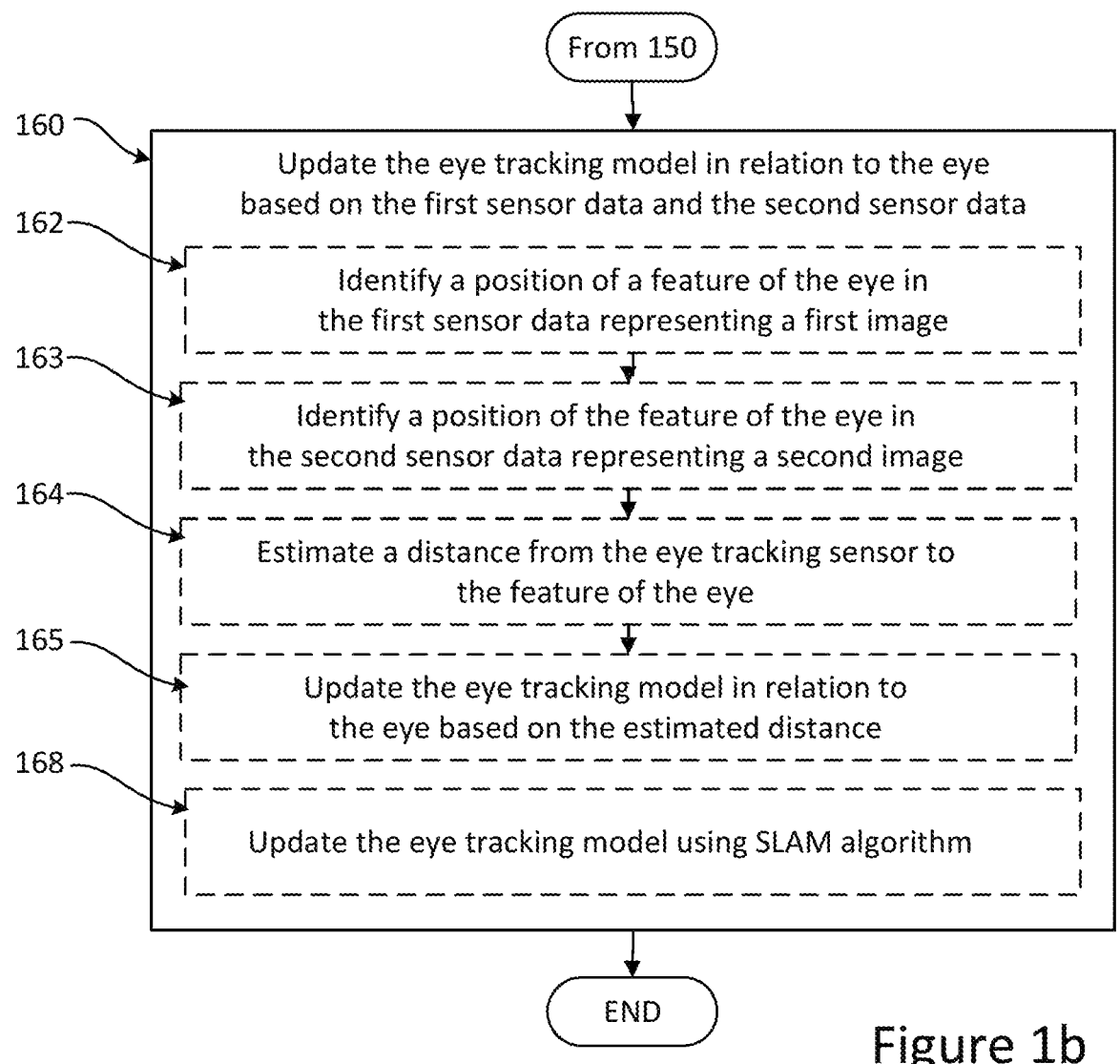
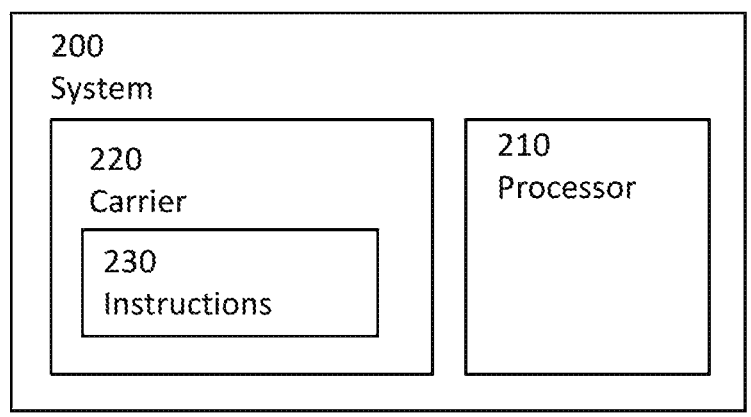
Figure 1b
Figure 2

METHODS AND SYSTEMS FOR A HEAD-MOUNTED DEVICE FOR UPDATING AN EYE TRACKING MODEL

CROSS-REFERENCES TO RELATED APPLICATIONS

This application claims priority to Swedish Application No. 1951103-9, filed Sep. 30, 2019; the content of which are hereby incorporated by reference.

TECHNICAL FIELD

The present disclosure relates to the field of eye tracking. In particular, the present disclosure relates to methods and systems for updating an eye tracking model in relation to an eye for a head-mounted device.

BACKGROUND

Head-mounted devices, e.g. for augmented reality or virtual reality, may advantageously be provided with eye tracking functionality. The eye tracking functionality is generally based on inclusion of an eye tracking system comprising one or more eye tracking sensors for receiving sensor data for each eye, e.g. in the form of images of each eye. By means of the images and an eye tracking model, gaze data, comprising a gaze ray, i.e. a gaze direction and a gaze origin, and/or a gaze position on a plane/display, of each eye, can be determined. The eye tracking model generally relates to a position of the eye tracking sensor and other parts and portions of the eye tracking system in relation to the eye and a model of the eye for each of the eyes.

When using a single eye tracking sensor per eye in a head-mounted device it will generally be difficult to achieve an accurate eye tracking model. When using at least two eye tracking sensors per eye, a more accurate eye tracking model can be achieved. However, adding eye tracking sensors will result in additional costs and added complexity. Hence, methods and systems providing a more accurate eye tracking model without adding complexity and costs to an existing head-mounted device is lacking in the art.

Hence, addressing the above-identified issues in the art is desirable.

SUMMARY

An object of the present disclosure is to mitigate, alleviate, or eliminate one or more of the above-identified issues in the art and disadvantages singly or in any combination.

This object is obtained by a method, a system, a head-mounted device, a computer program and a carrier as defined in the independent claims.

According to a first aspect, a method for a head-mounted device for updating an eye tracking model in relation to an eye is provided, wherein the head-mounted device comprises an eye tracking sensor. In the method, first sensor data in relation to the eye are obtained by means of the eye tracking sensor. After obtaining the first sensor data, the eye tracking sensor is moved in relation to the eye. After moving the eye tracking sensor, second sensor data in relation to the eye are obtained by means of the eye tracking sensor. The eye tracking model in relation to the eye is then updated based on the first sensor data and the second sensor data.

By moving the eye tracking sensor, the obtained first sensor data and the obtained second sensor data relate to the eye tracking sensor being positioned in two different positions in relation to the eye, i.e. before and after moving the eye tracking sensor, respectively. This will enable updating of the eye tracking model to become more accurate than would be possible with sensor data relating to the eye tracking sensor being positioned in a single position in relation to the eye.

A head-mounted device relates to a device mounted on a user's head and range from more bulky devices in the form of goggles for virtual reality to more slim devices in the form of glasses for augmented reality.

The present disclosure is at least partly based on the realization that moving the eye tracking sensor would enable achieving a more accurate eye tracking model using a single eye tracking sensor per eye and hence, adding a further eye tracking sensor per eye will not be required. In prior art such moving would generally be considered to add complexity of the structure of the eye tracking system. The present disclosure is further based on the realization that such moving of the eye tracking sensor need not require addition of further complexity of the structure of the head-mounted device if the movement of the eye tracking sensor is due to a movement that would take place anyway, is easily realized without increasing the complexity of the head-mounted device, or is already enabled. Hence, a more accurate eye tracking model may be provided without necessarily adding complexity and costs to an existing head-mounted device.

In embodiments, the eye tracking sensor is movably arranged in the head-mounted device. For example, the eye tracking sensor may be arranged on a part of the head-mounted device that is movably arranged in the head-mounted device. The part of the head-mounted device that is movably arranged in the head-mounted device is preferably a part which is already movably arranged for some other purpose. Hence, arranging the eye tracking sensor on the part would not necessarily add complexity and costs.

In alternative embodiments, the eye tracking sensor is immovably arranged in the head-mounted device. The eye tracking sensor may be moved by means of a movement of the head-mounted device that would take place anyway or is easily realized without increasing the complexity of the head-mounted device. For example, such movement may be due to a user putting the head-mounted device on her or his head or adjusting the head-mounted device on her or his head. Additionally, such movement can be induced by providing instructions to a user to move the head-mounted device, for example in a specific way. The instructions may for example be provided via a user interface, such as a display, microphone, headphones etc. Hence, no additional complexity or costs would necessarily be added.

In embodiments, the eye tracking sensor is arranged in relation to an optical system of the head-mounted device, such that the eye tracking sensor is moved in relation to the eye by moving the optical system in relation to the eye. The eye tracking sensor may be arranged on the optical system, e.g. on the glass, screen, lens cup, frame, display etc. and the eye tracking sensor may be moved by moving the optical system or at least the part of the optical system on which the eye tracking sensor is arranged. The optical system, or at least the part of the optical system on which the eye tracking sensor is arranged, may either be movably or immovably arranged in the head-mounted device. In the former case, the entire or at least a substantial part of the head-mounted system is moved in relation to the eye to move the optical system and hence to move the eye tracking sensor in relation to the eye. In the latter case, the optical system, or at least the part of the optical system on which the eye tracking sensor is arranged, is moved in the head-mounted device in relation to the eye to move the eye tracking sensor in relation to the eye. Hence, no additional complexity or costs would necessarily be added.

In further embodiments, the eye tracking sensor is arranged in relation to a display movably arranged in the head-mounted device, such that the eye tracking sensor is moved in relation to the eye by moving the display in the head-mounted device in relation to the eye. Movably arranged displays may already been provided in a head-mounted device for other reasons. For example such movably arranged displays may be provided in order to adapt the head-mounted device to different users having different distance between the eyes or to adapt to different interpupillary distance for a single user depending on a current gaze convergence distance. Hence, no additional complexity or costs would necessarily be added.

In embodiments, the eye tracking sensor may for example be an imaging device. The first sensor data represents a first image of the eye and the second sensor data represent a second image of the eye, and the movement is such that an angle between the eye tracking sensor and the eye is changed. Updating the eye tracking model comprises identifying a position of a feature of the eye in the first image, and identifying a position of the feature of the eye in the second image. A distance from the eye tracking sensor to the feature of the eye is then determined based on the position of the feature of the eye in the first image, the position of the feature of the eye in the second image, and the movement of the eye tracking sensor. The eye tracking model is updated in relation to the eye based on the determined distance.

In further embodiments, the method of the first aspect of the present disclosure further comprises, after obtaining the second sensor data, further moving the eye tracking sensor in relation to the eye, and after further moving the eye tracking sensor, obtaining third sensor data in relation to the eye by means of the eye tracking sensor. The updating of the eye tracking model in relation to the eye is then further based on the third sensor data.

In some embodiments, the movement of the eye tracking sensor is a known movement.

In further embodiments, the movement of the eye tracking sensor is a translational movement in relation to the eye.

In yet further embodiments, the eye tracking model is updated using a simultaneous localization and mapping, SLAM, algorithm.

In further embodiments, the eye tracking model is parameterized by a cornea parameter indicative of a radius of curvature of a cornea of the eye of the user, and wherein the updating of the eye tracking model comprises updating a value of the cornea parameter.

In further embodiments, the eye tracking model is parameterized by a pupil position parameter indicative of a pupil position of the eye of the user, and wherein the updating of the eye tracking model comprises updating a value of the pupil position parameter.

According to a second aspect, a system for a head-mounted display comprising an eye tracking sensor is provided. The system comprises a processor and a memory. The memory contains instructions executable by the processor, whereby the system is operative to perform the method according to the first aspect.

Embodiments of the system according to the second aspect may for example include features corresponding to the features of any of the embodiments of the method according to the first aspect.

According to a third aspect, a head-mounted device is provided comprising the system of the second aspect.

Embodiments of the head-mounted device according to the third aspect may for example include features corresponding to the features of any of the embodiments of the system according to the second aspect.

According to a fourth aspect, a computer program for a head-mounted device comprising an eye tracking sensor is provided. The computer program, comprises instructions which, when executed by at least one processor, cause at least one processor to perform the method according to the first aspect.

Causing the processor to perform the method according to the first aspect means that for each step of the method, the step is either performed in the processor or the processor triggers and/or controls a different entity to perform the step.

Embodiments of the computer program according to the fourth aspect may for example include features corresponding to the features of any of the embodiments of the method according to the first aspect.

According to a fifth aspect, a carrier comprising a computer program according to the fourth aspect is provided. The carrier is one of an electronic signal, optical signal, radio signal, and a computer readable storage medium.

Embodiments of the carrier according to the fifth aspect may for example include features corresponding to the features of any of the embodiments of the computer program according to the fourth aspect.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 1a and 1b is a flowchart illustrating embodiments of a method according to the present disclosure.

FIG. 2 is a block diagram illustrating embodiments of a system according to the present disclosure.

Figure 1A:
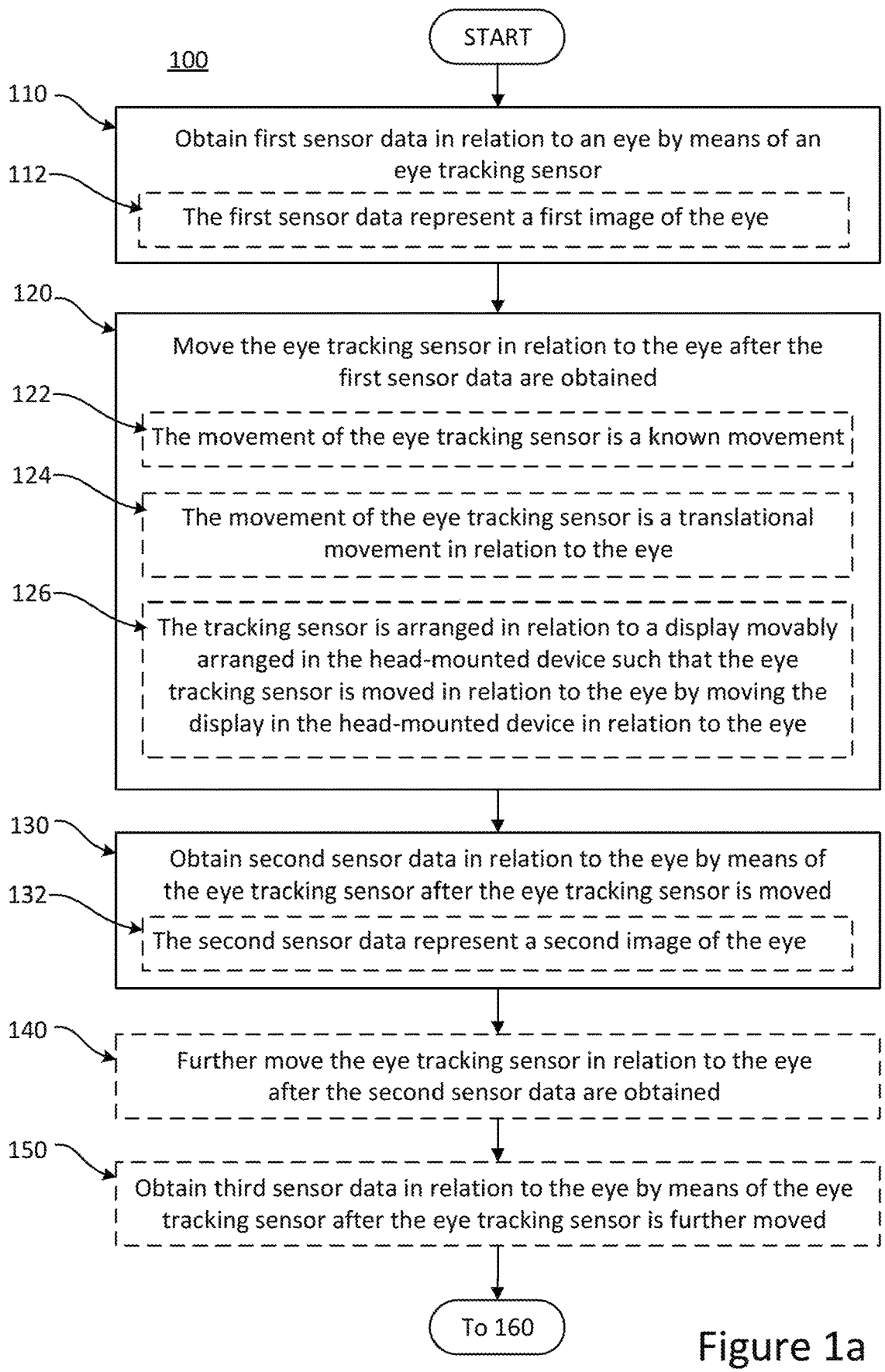

All the figures are schematic, not necessarily to scale, and generally only show parts which are necessary in order to elucidate the respective example, whereas other parts may be omitted or merely suggested.

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

In the following, descriptions of examples of methods and systems for a head-mounted device comprising an eye tracking sensor for updating an eye tracking model are provided. Common for the examples is that a single eye tracking sensor for one eye is used (and generally a single eye tracking sensor for the other eye as well) and sensor data are obtained by means of the single eye tracking sensor before and after the movement. The way the eye tracking sensor is moved depends amongst others on the application, the type of head-mounted device the eye tracking sensor is arranged in, and the way the eye tracking sensor is arranged in the head-mounted device. Two main alternatives are provided. In a first alternative, the eye tracking sensor is movably arranged in the head-mounted device and in the second alternative, the eye tracking sensor is immovably arranged in the head-mounted device. In the first alternative, the eye tracking sensor can be moved in the head-mounted device without moving the entire head-mounted device. Movably arranged generally means that the eye tracking sensor can be moved in relation to the eye when a user is wearing the head-mounted device, and without the need to change the position of the head-mounted device in relation to the user's head. However, there may be other parts or portions of the head-mounted device that also moves or are movable in the first alternative. In the second alternative, the entire or at least a substantial part of the head-mounted device needs to be moved in order to move the eye tracking sensor. Immovably arranged generally means that the eye tracking sensor cannot be moved in relation to the position of the eye when a user is wearing the head-mounted device without the need to change the position of the head-mounted device in relation to the user's head. However, there may be other parts or portions of the head-mounted device that can remain still when the head-mounted device is moved in relation to the user's head in order to move the eye tracking sensor in relation to the eye of the user.

An example according to the first alternative where the eye tracking sensor is movably arranged in a head-mounted device, is when the eye tracking sensor is arranged such that it moves together with a display (or lens cup or other) of a virtual retina display movably arranged in a head-mounted device or together with a display (or lens cup or other) movably arranged in a head-mounted device with a mechanism for interpupillary distance adjustment.

An example according to the second alternative where the eye tracking sensor is immovably arranged in a head-mounted device, is when the eye tracking sensor is arranged such that it moves together with the entire head-mounted device such as when the eye tracking sensor is immovably arranged on the head-mounted device by asking the user to move the head-mounted device up and down or by using the movement when the user puts on or adjusts the head-mounted device.

FIGS. 1a and 1b show a flowchart illustrating embodiments of a method 100 for a head-mounted device for updating an eye tracking model in relation to an eye, wherein the head-mounted device comprises an eye tracking sensor. The step of updating the eye tracking model in relation to an eye may include estimating the eye tracking model in relation to the eye based on the first sensor data and the second sensor data. Depending on the application, the eye tracking model may relate to one of a number of different types. In some applications the eye tracking model may parameterized by a cornea parameter indicative of a radius of curvature of a cornea of the eye of the user. In some applications the eye tracking model is parameterized by a pupil position parameter indicative of a pupil position of the eye of the user. Further, the eye tracking model may be parameterized by radius and/or position of the eyeball.

Reference is made to FIG. 1a. In the method 100 first sensor data in relation to the eye of the user are obtained 110 by means of the eye tracking sensor. The sensor data may be of different types, such as a digital image of the eye captured by an eye tracking sensor in the form of a digital image sensor. For some application, it would be sufficient with a digital image sensor for registering visible light. For other applications, a digital image sensor for registering infrared light would be required, such as when glints from infrared light sources are used to determine gaze data.

After the first sensor data have been obtained 110, the eye tracking sensor is moved 120 in relation to the eye. As indicated hereinabove, the eye tracking sensor may be immovably arranged in the head-mounted device or movably arranged in the head-mounted device. In either case, but in the latter case in particular, the movement of the eye tracking sensor in relation to the eye may be a known movement 122. In some examples, the movement may be completely known such that both distance and direction of the movement is known. In such examples, the known movement may be used to perform exact calculations in later steps of the method. In other examples the movement is only know to some extent, such as for example only the direction of movement is known and not the exact distance of the movement. In such examples, the partly known movement may be used to make approximate calculations in later steps of the method. Even if the movement is completely unknown, there are approximate algorithms such as simultaneous localization and mapping (SLAM) that may be applied over a series of alternating obtaining of sensor data and movement of the eye tracking sensor.

In specific examples, the movement of the eye tracking sensor is a translational movement 124 in relation to the eye.

In some examples where the eye tracking sensor is movably arranged in the head-mounted device, the eye tracking sensor is arranged in relation to a display (or lens cup or other), which display is movably arranged in the head-mounted device. The eye tracking sensor is then moved in relation to the eye by moving 126 the display (or lens cup or other) in the head-mounted device in relation to the eye. Such movably arranged (or lens cup or other) may for example be provided in a head-mounted device where the display (or lens cup or other) should be movably arranged also for another purpose. For example, such arranging may be necessary in order to calibrate a virtual retina display in relation to interpupillary distance of a user and for supporting a mechanism for continuous adjustment of a display in relation to interpupillary distance based on a current gaze convergence distance of a user. The movement of the display (or lens cup or other) then typically horizontal and translational in relation to the eye.

After the eye tracking sensor has been moved 120, second sensor data in relation to the eye are obtained 130 by means of the eye tracking sensor. The second sensor data are typically of the same type as the first sensor data.

In some examples, the eye tracking sensor may be further moved 140 in relation to the eye after the second sensor data have been obtained 130. This further movement 140 may be of the same type as the movement 120 after the first sensor data have been obtained 110.

The further movement 140 of the eye tracking sensor is then followed by obtaining 150 third sensor data in relation to the eye by means of the eye tracking sensor.

The process may be repeated by series of alternating movements of the eye tracking sensor and obtaining of sensor data, and the result can be used in approximate algorithms such as simultaneous localization and mapping (SLAM) in later steps.

Reference is now made to FIG. 1b. The method 100 continues with updating 160 the eye tracking model in relation to the eye based on the first sensor data and the second sensor data (and third sensor data or more if available). Since the first sensor data and the second sensor data have been obtained by means of the eye tracking sensor before and after movement of the eye tracking sensor, respectively, they will provide additional information in relation to using the single eye tracking sensor without movement. In an example, the first sensor data represent 112 a first image 440 and the second sensor data represent 132 a second image 460. Furthermore, the movement is such that an angle between the eye tracking sensor and the eye is changed. In such an example, a position of a feature of the eye in the first image can be identified 162, and a position of the feature in the second image can be identified 163. Based on the position of the feature in the first image, the position of the feature in the second image, and the movement of the eye tracking sensor, a distance from the eye tracking sensor to the feature of the eye is determined 164. The eye tracking model is then updated 165 based on the determined distance. If, for example, the movement is a known horizontal translational movement which is sufficiently fast and short such that the time between obtaining the two images is short, the two images produced will be very close to two images produced in a stereo setup and hence stereoscopic techniques may be used to determine a distance from the eye tracking sensor to the feature of the eye.

If the movement is unknown, approximate algorithms such as simultaneous localization and mapping (SLAM) may be applied to update 168 the eye tracking model. In such a case, the algorithm may advantageously be applied over a series of alternating obtaining of sensor data and movement of the eye tracking sensor.

FIGS. 1a and 1b comprise some steps that are illustrated in boxes with a solid border and some steps that are illustrated in boxes with a dashed border. The steps that are comprised in boxes with a solid border are operations that are comprised in the broadest example embodiment. The steps that are comprised in boxes with a dashed border are example embodiments that may be comprised in, or a part of, or are further operations that may be taken in addition to the operations of the border example embodiments. The steps do not all need to be performed in order and not all of the operations need to be performed. Furthermore, at least some of the steps may be performed in parallel.

Methods for a head-mounted device for updating an eye tracking model in relation to an eye and steps therein as disclosed herein, e.g. in relation to FIGS. 1a and 1b, may be implemented in a system 200 of FIG. 2. The system 200 comprises a processor 210, and a carrier 220 including computer executable instructions 230, e.g. in the form of a computer program, that, when executed by the processor 210, cause the system 200 to perform the method. The carrier 220 may for example be an electronic signal, optical signal, radio signal, a transitory computer readable storage medium, and a non-transitory computer readable storage medium.

Figure 3:
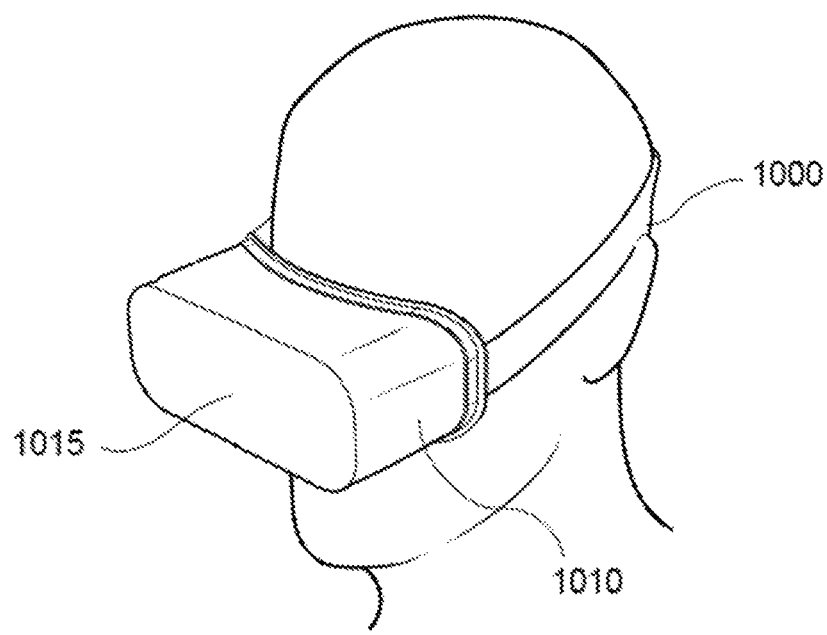
FIG. 3 is a schematic illustration of embodiments of a head-mounted device according to the present disclosure.

The system 200 as illustrated in relation to FIG. 2 may for example be implemented in a head-mounted device as illustrated in FIG. 3.

Figure 4:
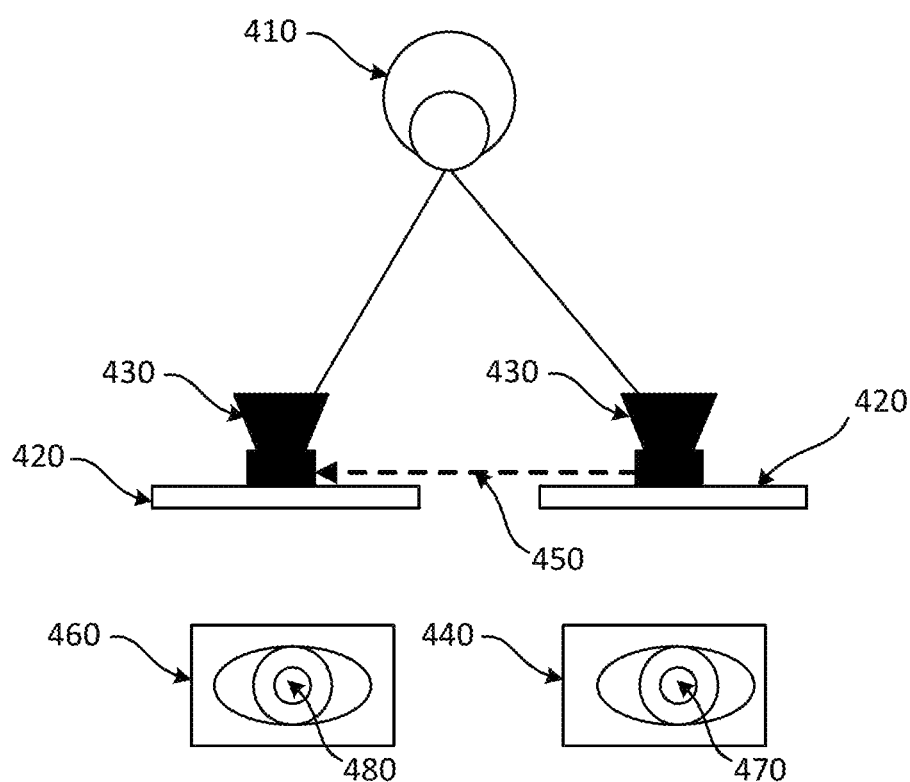
FIG. 4 is a schematic view of a user's eye in relation to embodiments of a method, system and head-mounted device according to the present disclosure.

FIG. 3 shows a head-mounted device 1010 according to one or more embodiments. The head-mounted device 1010, is a device which may optionally be adapted to be mounted (or arranged) at the head of a user 1000, as shown in FIG. 4. The head-mounted device 1010 may e.g. comprise and/or be comprised in a head-mounted display, HMD, such as a VR headset, an AR headset or an MR headset. The head-mounted device 1010 or HMD comprises a displaying device 1015, which is able to visualize a plurality of objects in response to a control signal received from a computer. The displaying device 1015 may be transparent for real world experiences and non-transparent for virtual world experience. The head-mounted device 1010 is typically further configured to provide eye tracker functionality by a gaze tracking signal using one or more eye tracking sensors (not shown), e.g. indicative of a pupil position, a gaze direction and/or a convergence distance. In other words, the head-mounted device 1010 is typically configured to provide an indication of an object the user is looking at and/or a depth at which the user is looking/watching. The head-mounted device 1010 comprises a single eye tracking sensor for each eye.

The displaying device 1015 may for example be 3D display, such as a stereoscopic display. The 3D display may for example be comprised glasses equipped with AR functionality. Further, the 3D display may be a volumetric 3D display, being either autostereoscopic or automultiscopic, which may indicate that they create 3D imagery visible to an unaided eye, without requiring stereo goggles or stereo head-mounted displays. Consequently, the 3D display may be part of the head-mounted device 1010.

In a general example, the display (lens cup or other) is horizontally moveable in relation to the eye, e.g. in order to enable centralisation in respect to a pupil. By arranging one eye tracking sensor per eye on the respective horizontally moveable display (lens cup or other) per eye, the eye tracking sensor will also be horizontally moveable and hence the method embodiments of the method of the present disclosure can be performed.

One specific example where a display is horizontally moveable is for a head-mounted device using virtual retina displays. In such an application, transflective/reflective optics are used to reflect scanned light from a light source, e.g. using an RGB light engine and a MEMS scanning mirror which can be tilted is already arranged to be horizontally moveable in relation to the eye in order to be able to be adjusted to align with the position of the pupil of the eye.

It is to be noted that the design of the head-mounted device illustrated in FIG. 3 is only an example. Head-mounted devices according to the present disclosure are not tied to a specific design. Other designs, such as a design more similar to regular glasses typically used for smart glasses, are encompassed.

FIG. 4 is a schematic view of a user's eye 410 in relation to embodiments of a method, system and head-mounted device according to the present disclosure.

A movable part 420 of a head-mounted device, such as a movable display 420 is provided. On the movable display 420, or on a frame of the movable display 420, an eye tracking sensor in the form of a camera 430 is arranged such that the camera 430 is moved when the display 420 is moved. First sensor data in the form of a first image 440 are obtained and after a known movement 450 of the display 420 and the camera 430, second sensor data in the form of a second image 460 are obtained. The movement 450 is a translational movement 450 in relation to the eye 410. It is to be noted that the size of the movement 450 is exaggerated in relation to the distance from the camera 430 to the eye 410 in FIG. 4 for illustrative purposes. The movement is generally in the order of millimetres. A position 470 of a feature of the eye, such as a pupil, in the first image 440 is identified and a position 480 of the feature in the second image 460 is identified. Now, based on the known movement 450, the position 470 of the feature of the eye in the first image 440, the position 480 of the feature of the eye in the second image 460, a distance from the camera 430 to the feature of the eye can be determined.

In one example, the eye tracking sensor is arranged in relation to an optical system of the head-mounted device 1010, such that the eye tracking sensor is moved 450 in relation to the eye 410 by moving the optical system in relation to the eye 410. The eye tracking sensor may be arranged on the optical system, e.g. on the glass, screen, lens cup, frame, display etc. and the eye tracking sensor may be moved by moving the optical system or at least the part of the optical system on which the eye tracking sensor is arranged. The optical system, or at least the part of the optical system on which the eye tracking sensor is arranged, may either be movably or immovably arranged in the head-mounted device 1010.

A person skilled in the art realizes that the present invention is by no means limited to the embodiments described above. On the contrary, many modifications and variations are possible within the scope of the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The terminology used herein is for the purpose of describing particular aspects of the disclosure only, and is not intended to limit the invention. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

The invention claimed is:

1. A method for a head-mounted device for updating an eye tracking model in relation to an eye, wherein the head-mounted device comprises an eye tracking sensor and wherein the eye tracking model relates to a position of the eye tracking sensor and other components of the head-mounted device and a model of each eye, the method comprising:
obtaining, by means of the eye tracking sensor, first sensor data in relation to the eye;
moving the eye tracking sensor along an axis parallel to a line bisecting the eyes, wherein the eye tracking sensor is moved after obtaining the first sensor data;
obtaining, by means of the eye tracking sensor, second sensor data in relation to the eye, wherein the second sensor data are obtained after moving the eye tracking sensor; and
updating the eye tracking model in relation to the eye, based on the first sensor data and the second sensor data.

2. The method of claim 1, wherein the eye tracking sensor is movably arranged in the head-mounted device.

3. The method of claim 1, wherein the eye tracking sensor is immovably arranged in the head-mounted device.

4. The method of claim 1, wherein the eye tracking sensor is arranged in relation to an optical system of the head-mounted device, such that the eye tracking sensor is moved in relation to the eye by moving the optical system in relation to the eye.

5. The method of claim 1, wherein the eye tracking sensor is arranged in relation to a display movably arranged in the head-mounted device, such that the eye tracking sensor is moved in relation to the eye by moving the display in the head-mounted device in relation to the eye.

6. The method of claim 1, wherein the first sensor data represent a first image of the eye and the second sensor data represent a second image of the eye, wherein the movement is such that an angle between the eye tracking sensor and the eye is changed, and wherein updating the eye tracking model further comprises:
identifying a position of a feature of the eye in the first image; identifying a position of the feature of the eye in the second image;
determining a distance from the eye tracking sensor to the feature of the eye based on the position of the feature of the eye in the first image, the position of the feature of the eye in the second image, and the movement of the eye tracking sensor; and
updating the eye tracking model in relation to the eye based on the determined distance.

7. The method of claim 1, further comprising:
further moving the eye tracking sensor in relation to the eye, wherein the eye tracking sensor is further moved after obtaining the second sensor data; and
obtaining, by means of the eye tracking sensor, third sensor data in relation to the eye, wherein the third sensor data are obtained after further moving the eye tracking sensor,
wherein the updating of the eye tracking model in relation to the eye is further based on the third sensor data.

8. The method of claim 1, wherein the movement of the eye tracking sensor is a known movement.

9. The method of claim 1, wherein the movement of the eye tracking sensor is a translational movement in relation to the eye.

10. The method of claim 1, wherein the eye tracking model is updated using a simultaneous localization and mapping, SLAM, algorithm.

11. The method of claim 1, wherein the eye tracking model is parameterized by a cornea parameter indicative of a radius of curvature of a cornea of the eye of the user, and wherein the updating of the eye tracking model comprises updating a value of the cornea parameter.

12. The method of claim 1, wherein the eye tracking model is parameterized by a pupil position parameter indicative of a pupil position of the eye of the user, and wherein the updating of the eye tracking model comprises updating a value of the pupil position parameter.

13. A system for a head-mounted device for updating an eye tracking model in relation to an eye, wherein the head-mounted device comprises an eye tracking sensor and wherein the eye tracking model relates to a position of the eye tracking sensor and other components of the head-mounted device and a model of each eye, the system comprising a processor, and a memory, said memory containing instructions executable by said processor, whereby said system is operative to:
- obtain, by the eye tracking sensor, first sensor data in relation to the eye;
- move the eye tracking sensor along an axis parallel to a line bisecting the eyes, wherein the eye tracking sensor is moved after obtaining the first sensor data;
- obtain, by the eye tracking sensor, second sensor data in relation to the eye, wherein the second sensor data are obtained after moving the eye tracking sensor; and
- update the eye tracking model in relation to the eye, based on the first sensor data and the second sensor data.

14. A head-mounted device comprising the system of claim 13.

15. A non-transitory computer-readable storage medium storing instructions which, when executed by a head-mounted device cause the head-mounted device to carry out the steps of:
- obtaining, by the eye tracking sensor, first sensor data in relation to the eye;
- moving the eye tracking sensor along an axis parallel to a line bisecting the eyes, wherein the eye tracking sensor is moved after obtaining the first sensor data;
- obtaining, by the eye tracking sensor, second sensor data in relation to the eye, wherein the second sensor data are obtained after moving the eye tracking sensor; and
- updating the eye tracking model in relation to the eye, based on the first sensor data and the second sensor data.

* * * * *